(12) United States Patent
Wong et al.

(10) Patent No.: US 11,934,985 B2
(45) Date of Patent: Mar. 19, 2024

(54) DRIVING RISK COMPUTING DEVICE AND METHODS

(71) Applicant: V3 Smart Technologies Pte Ltd, Singapore (SG)

(72) Inventors: Shih Jon Wong, Singapore (SG); Chia Wei Chang, Singapore (SG)

(73) Assignee: V3 SMART TECHNOLOGIES PTE LTD, Singapore (SG)

( * ) Notice: Subject to any disclaimer, the term of this patent is extended or adjusted under 35 U.S.C. 154(b) by 685 days.

(21) Appl. No.: 17/045,106

(22) PCT Filed: Mar. 27, 2019

(86) PCT No.: PCT/SG2019/050168
§ 371 (c)(1),
(2) Date: Oct. 2, 2020

(87) PCT Pub. No.: WO2019/226117
PCT Pub. Date: Nov. 28, 2019

(65) Prior Publication Data
US 2021/0370955 A1 Dec. 2, 2021

(30) Foreign Application Priority Data

May 22, 2018 (SG) .......................... 10201804336W

(51) Int. Cl.
*G06Q 10/0635* (2023.01)
*B60W 40/02* (2006.01)
(Continued)

(52) U.S. Cl.
CPC ......... *G06Q 10/0635* (2013.01); *B60W 40/02* (2013.01); *B60W 40/09* (2013.01);
(Continued)

(58) Field of Classification Search
CPC .... B60W 40/02; B60W 40/09; B60W 40/105; B60W 40/107; B60W 40/109;
(Continued)

(56) References Cited

U.S. PATENT DOCUMENTS 8,250,004 B2   8/2012   Angelov
8,718,858 B2   5/2014   Al-Mahnna
(Continued)

FOREIGN PATENT DOCUMENTS

CN   101633359 A   1/2010
CN   104093618 A   10/2014
CN   107065855 A   8/2017

*Primary Examiner* — Stephen R Burgdorf
(74) *Attorney, Agent, or Firm* — Stoel Rives LLP

(57) ABSTRACT

According to one embodiment, there is provided a computing device and method for evaluating driving risk. The computing device includes an input circuit and a processor. The input circuit is configured to receive data from a vehicle. The data includes at least one of GPS data, acceleration data or image data of views external of the vehicle or inside the cabin. Thereafter, the processor is configured to identify a plurality of risks based on the data received from the vehicle, determine a plurality of weightages which are assigned to the plurality of risks, and generate a score based on the plurality of weightages for the plurality of risks.

21 Claims, 5 Drawing Sheets

(51) Int. Cl.
    *B60W 40/08*     (2012.01)
    *B60W 40/09*     (2012.01)
    *G06F 18/24*     (2023.01)
    *G06N 20/00*     (2019.01)
    *G06Q 40/08*     (2012.01)
    *G06V 20/56*     (2022.01)
    *G06V 20/59*     (2022.01)
    *G06V 40/16*     (2022.01)

(52) U.S. Cl.
    CPC ............ *G06F 18/24* (2023.01); *G06N 20/00* (2019.01); *G06Q 40/08* (2013.01); *G06V 20/56* (2022.01); *G06V 20/597* (2022.01); *G06V 40/172* (2022.01); *B60W 2040/0809* (2013.01); *B60W 2520/105* (2013.01); *B60W 2540/043* (2020.02); *B60W 2540/223* (2020.02); *B60W 2556/50* (2020.02)

(58) Field of Classification Search
    CPC . B60W 2040/0809; B60W 2050/0028; B60W 2400/00; B60W 2420/42; B60W 2520/10; B60W 2520/105; B60W 2520/12; B60W 2520/125; B60W 2530/18; B60W 2540/043; B60W 2540/223; B60W 2540/225; B60W 2540/30; B60W 2552/53; B60W 2554/802; B60W 2555/20; B60W 2555/60; B60W 2556/10; B60W 2556/45; B60W 2556/60; G06F 3/011; G06F 17/00; G06F 18/24; G06N 3/045; G06N 5/01; G06N 20/00; G06N 20/10; G06N 22/20; G06Q 10/0635; G06Q 10/06398; G06Q 30/0283; G06Q 50/30; G06Q 40/08; G06V 20/56; G06V 20/588; G06V 20/597; G06V 40/172; G06V 40/174; G07C 5/00; G07C 5/008; G07C 5/0808; G07C 5/0816; G08G 1/0112; G08G 1/0133; G08G 1/04; G08G 1/052
    USPC ........................................................ 340/576
    See application file for complete search history.

(56) References Cited

U.S. PATENT DOCUMENTS

| | | |
|---|---|---|
| 2010/0238009 A1 | 9/2010 | Cook et al. |
| 2011/0258044 A1 | 10/2011 | Kargupta |
| 2012/0072243 A1* | 3/2012 | Collins .................. G06Q 10/10 705/4 |
| 2015/0193885 A1* | 7/2015 | Akiva .................. G07C 5/0841 705/4 |
| 2016/0203560 A1 | 7/2016 | Parameshwaran |
| 2017/0088142 A1* | 3/2017 | Hunt ...................... B60W 40/09 |
| 2018/0164825 A1* | 6/2018 | Matus .................... B60W 30/00 |
| 2020/0057487 A1* | 2/2020 | Sicconi .................. G06T 7/254 |
| 2020/0058218 A1* | 2/2020 | Julian .................... G06V 20/56 |
| 2020/0160699 A1* | 5/2020 | Annapureddy ........... G06T 7/70 |
| 2020/0166897 A1* | 5/2020 | Campos ................ B60W 40/09 |

* cited by examiner

100

200

300

400

*Manoeuvre Classification*

500

DRIVING RISK COMPUTING DEVICE AND METHODS

RELATED APPLICATIONS

This application is a national stage filing under 35 U.S.C. § 371 of International Application No. PCT/SG2019/050168, filed Mar. 27, 2019, which claims priority of Singaporean Patent Application No. 10201804336W, filed May 22, 2018, both of which are incorporated by reference in their entireties.

FIELD OF INVENTION

The present invention relates to a computing device and method for evaluating driving risk, and more particularly, a computing device and method for driving behavior analysis, driver risk profiling and accident prevention.

BACKGROUND

Evaluating driving risk by analyzing patterns in GPS, accelerometer, and G-force data helps to improve driving safety. Nowadays, the information gathering and transmitting of vehicles is mostly done by telematics devices, and the analyzed data is extensively employed by auto insurance providers to assess drivers' behaviors and reconstruct accidents. In the future of semi-autonomous or autonomous vehicles, the analytics data from telematics can also be used for improving autonomous capability.

Current insurance telematics device, with data collected from GPS and 3-axis accelerometer, is capable of speed monitoring, motion detection and incident detection. However, despite of successful detection of certain vehicle movements (e.g. hard braking, sudden turning), it may not be sufficient to determine who is at fault in the event of an accident without contextualization.

There is similar insufficiency when telematics data is used for evaluating driving practice, mainly because GPS and 3-axis accelerometer are not able to detect drivers' in-cabin movements such as signaling, blind spot checking or putting on seat belt. For insurance providers, information of these driving practices can be valuable to price the premiums of different drivers.

Thus, what is needed is a device and method that can evaluate driving risk by integrating data from GPS, accelerometer, camera video of vehicle's surrounding environment and in-cabin camera video. With a combined analysis and calculation of the data received from a vehicle, a score can be generated for the driving and the score can be used for driving practice evaluation and accident prevention purposes.

SUMMARY

According to a first aspect, there is provided a computing device for evaluating driving risk. The computing device includes an input circuit configured to receive data from a vehicle, the data comprising at least one of GPS data, acceleration data or image data. The computing device further includes a processor, and the processor is configured to train a situation classification model based on the data received from the vehicle using machine learning methods to classify various driving situations. The processor is further configured to identify a plurality of risks based on the data received from the vehicle and one or more of the various driving situations classified by the situation classification model, determine a plurality of weightages wherein a respective weightage is assigned for each of the plurality of risks, and generate a score based on the plurality of weightages for the plurality of risks.

According to a second aspect, there is provided a method for evaluating driving risk. The method includes: receiving data from a vehicle, the data comprising at least one of GPS data, acceleration data and image data; training a situation classification model based on the data received from the vehicle using machine learning methods to classify various driving situations; thereafter identifying a plurality of risks based on the data received from the vehicle and one or more of the various driving situations classified by the situation classification model; determining a plurality of weightages, wherein a respective weightage is assigned for each of the plurality of risks; and generating a score based on the plurality of weightages for the plurality of risks.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Figure 1:
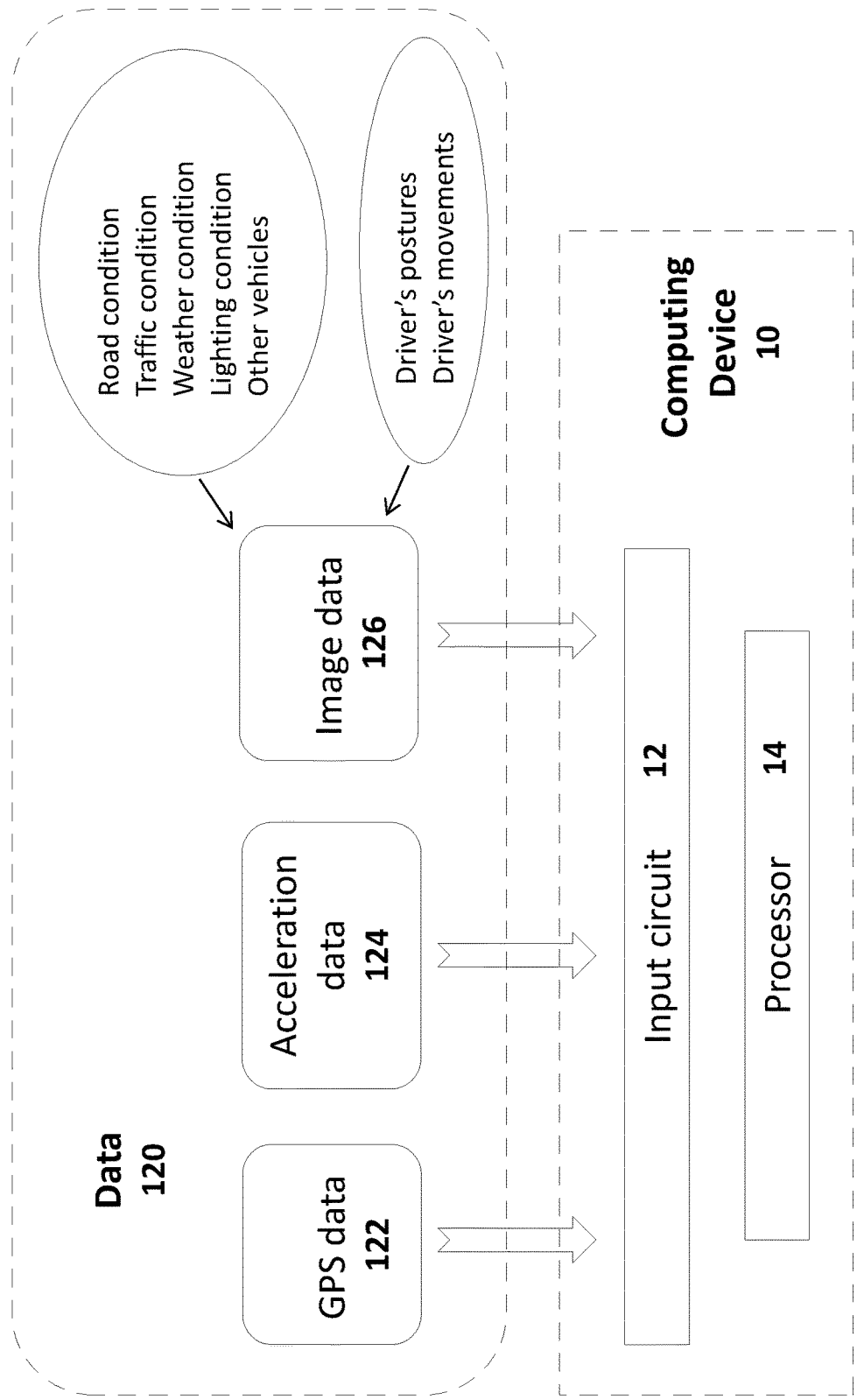
FIG. 1 depicts an illustration of a computing device for evaluating driving risk in accordance with a present embodiment.

Skilled artisans will appreciate that elements in the figures are illustrated for simplicity and clarity and have not necessarily been depicted to scale. For example, the dimensions of some of the elements in the illustrations or diagrams may be exaggerated in respect to other elements to help to improve understanding of the present embodiments.

DETAILED DESCRIPTION

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "determining", "computing", "generating", "processing", "receiving", "collecting", "storing" or the like, refer to the action and processes of a computer system, or similar electronic device, that manipulates and transforms data represented as physical quantities within the computer system into other data similarly represented as physical quantities within the computer system or other information storage, transmission or display devices.

Referring to FIG. 1, an illustration 100 of a computing device 10 for evaluating driving risk in accordance with a present embodiment is depicted. The computing device 10, which can be of a variety of types with the ability to execute programmed instructions, includes an input circuit 12 and a processor 14 in the present embodiment. Although a single input circuit and a single processor are shown for the sake of clarity, the computing device 10 may also include multiple input circuits and a multi-processor system.

The input circuit 12 is configured to receive data 120 from a vehicle. The data 120 may include GPS data 122, which can provide information of the location of the vehicle, the speed of the vehicle, the travelling distance and the travelling direction. The data 120 may also include acceleration data 124, which can be obtained from accelerometer (e.g., 3-axis accelerometer) of the vehicle. The acceleration data 124 can include accelerations that are linear or non-linear, in different directions or planes. The data 120 may further include image data 126. The image data 126 can be obtained from one or more still cameras or video cameras placed in various locations of the vehicle. The image data 126 can be captured by the cameras with external views of surrounding environment outside the vehicle, including road condition, traffic condition, blind spot condition, weather condition, lighting condition and other vehicles. Additionally, the image data 126 also includes images captured by the cameras with views inside the vehicle (e.g. in-cabin view). For non-autonomous vehicles where drivers are required, the cameras with views inside the vehicle can provide images of driver's postures and movements, such as head movements, hand movements or eye movements.

Figure 2:
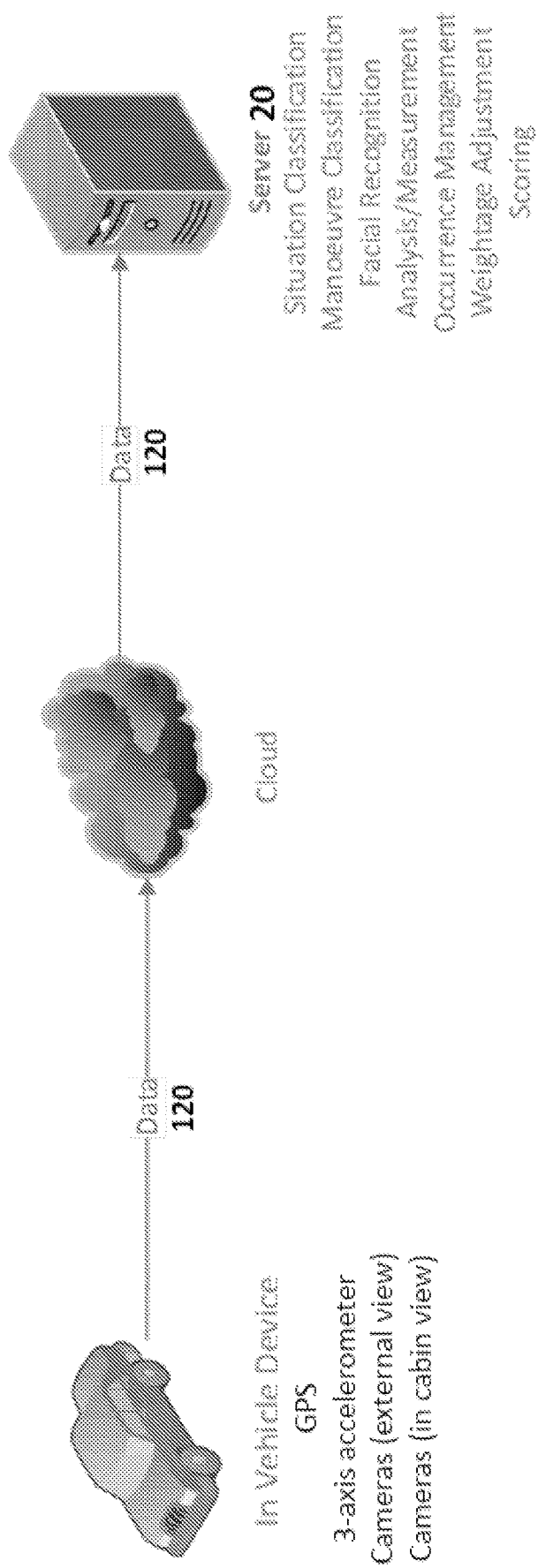
FIG. 2 depicts an illustration of a system for evaluating driving risk of a vehicle in accordance with the present embodiment.

Referring to FIG. 2, an illustration of a system for evaluating driving risk of a vehicle in accordance with the present embodiment is depicted. The devices in the vehicle for collecting the data 120 may include a GPS, 3-axis accelerometers, at least one camera with external views of surrounding environment outside the vehicle, and at least one camera with in-cabin view. In the present embodiment, the data 120 is further processed by a server 20. As shown in the illustrated embodiment, the server 20 locates separately from the vehicle and can be remotely accessed via cloud. Alternatively, the server 20 can be located inside the vehicle where GPS data 122, acceleration data 124 and image data 126 are collected. Preferably, the server 20 is connected to a communication bus to receive the data 120, which allows processing the real-time data collected from the vehicle. Alternatively, the data 120 may be stored in various forms of memory or storage medium (e.g., random access memory, read only memory, hard disk drive, removable storage drive) and processed at the server 20 subsequently.

Figure 3:
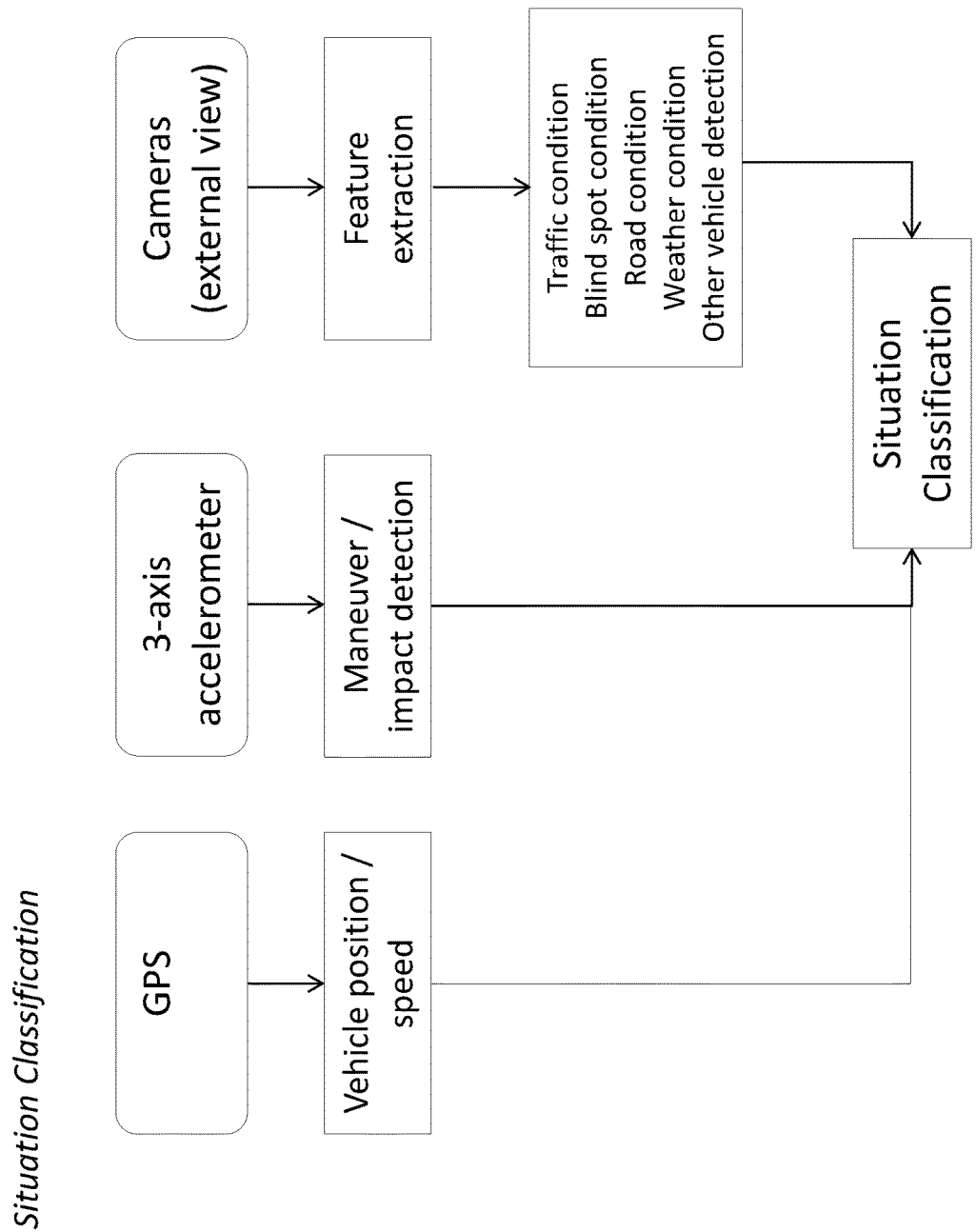
FIG. 3 depicts a block diagram of a situation classification model in accordance with the present embodiment.

Referring to FIG. 3, an illustration 300 of a block diagram of a situation classification model in accordance with the present embodiment is depicted. The data received from the vehicle is combined and processed to train the situation classification model. Preferably, different machine learning methods are used to efficiently train the situation classification model. As an example, computer vision methods, which can be traditional computer vision methods or deep learning methods (e.g. convolutional neural network), are used for processing the image data. Preferably, computer vision analysis of the image data from the camera with external views can provide information on traffic condition (e.g., slowing moving traffic), road condition (e.g., cross junction, zebra crossing, humps, slopes), weather condition (e.g., rain, snow) and other vehicle detection (e.g., vehicle driving in front, vehicle switching lane). Non-image data can be processed by other machine learning methods, such as random forest, support vector machines, linear regression, logistic regression, nearest neighbor and decision tree.

Other data collected from the vehicle, for example, GPS positions, vehicle speed, and manoeuvre/impact detection from the acceleration data and G-force data, are also used for the situation classification model. Data collected from the vehicle may further include data from additional sensors or devices to provide a more comprehensive dataset, such as temperature data, humidity data, tire pressure or the like.

Based on all the data presented above, the situation classification model can be trained to classify various driving situations, including but not limited to one or more of the following: approaching a traffic light regulated junction, approaching a traffic sign regulated junction, approaching a non-regulated cross junction, approaching a non-regulated T junction, approaching a zebra crossing, turning from a major/minor road to a major/minor road, U-turning, reversing, lane changing in slow/fast moving traffic, overtaking in slow/fast moving traffic, overtaking along single carriageway, negotiating sharp bends, driving upslope/downslope, stopping upslope/downslope, moving off upslope/downslope, avoiding hazards to the vehicles to the front or to the side, entering/exiting highways, raining/snowing weather, and high/low visibility.

Figure 4:
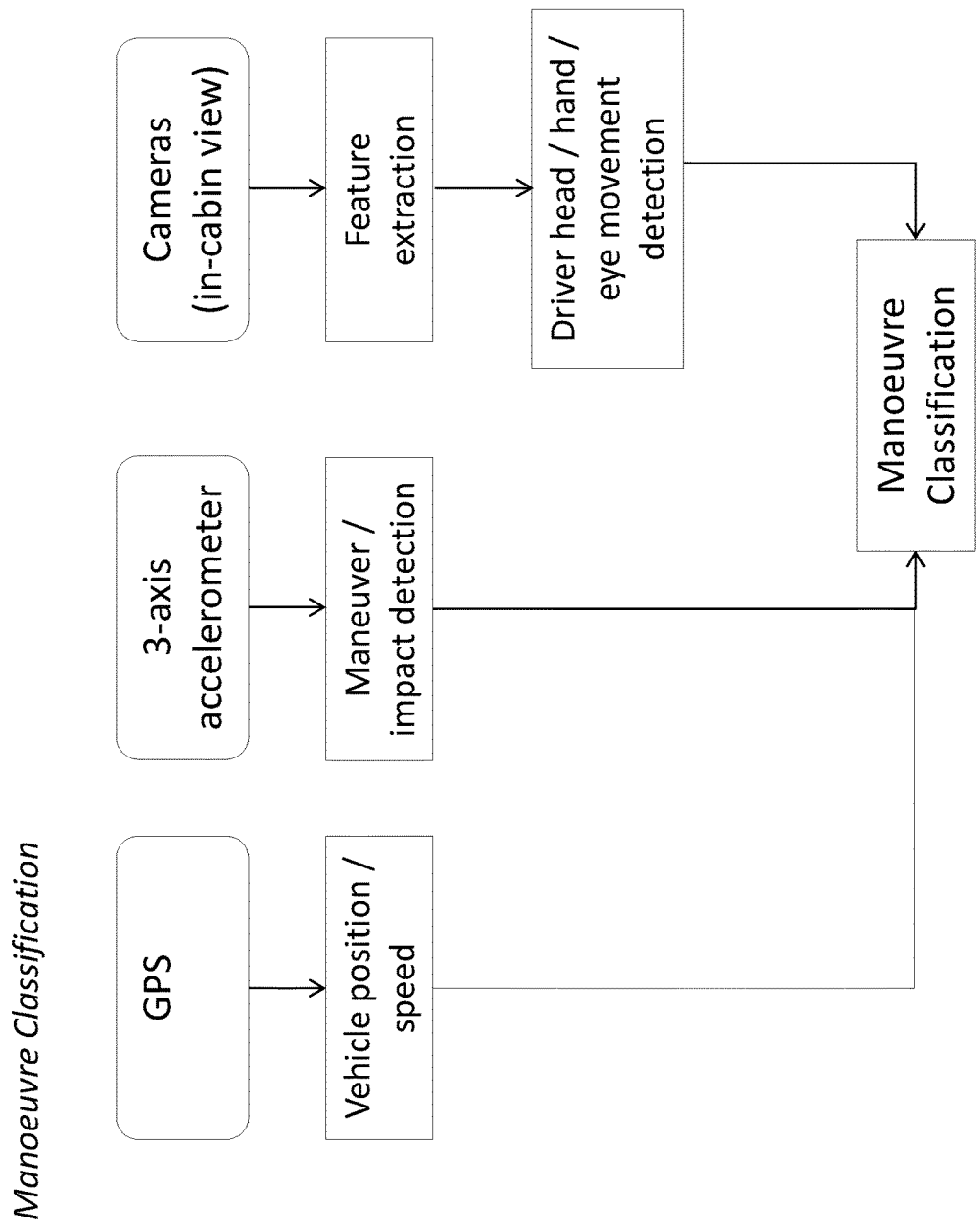
FIG. 4 depicts a block diagram of a manoeuver classification model in accordance with the present embodiment.

Referring to FIG. 4, an illustration 400 of a block diagram of a manoeuvre classification model in accordance with the present embodiment is depicted. The data received from the vehicle is combined and processed to train the manoeuvre classification model. Preferably, different machine learning methods are used to efficiently train the manoeuvre classification model. As an example, computer vision methods, which can be traditional computer vision methods or deep learning methods (e.g. convolutional neural network), are used for processing the image data. Preferably, for non-autonomous vehicles where drivers are required, computer vision analysis from the camera with in-cabin view can provide information on the driver's head, hand and eye movements (e.g., checking blind spot, putting on seat belt, signaling).

Other data collected from the vehicle, for example, GPS positions, vehicle speed and manoeuvre/impact detection from the acceleration data and G-force data, are also used for the manoeuvre classification model. Based on all the data presented above, the manoeuvre classification model can be trained to classify various driver and vehicle manoeuvres, including but not limited to one or more of the following: accelerating, braking, steering, signaling, engaging/releasing hand brake, checking rear view mirror, checking side view mirror, checking blind spot, putting on/taking off seat belt, and driving while distracted/intoxicated/drowsy/sleepy.

Figure 5:
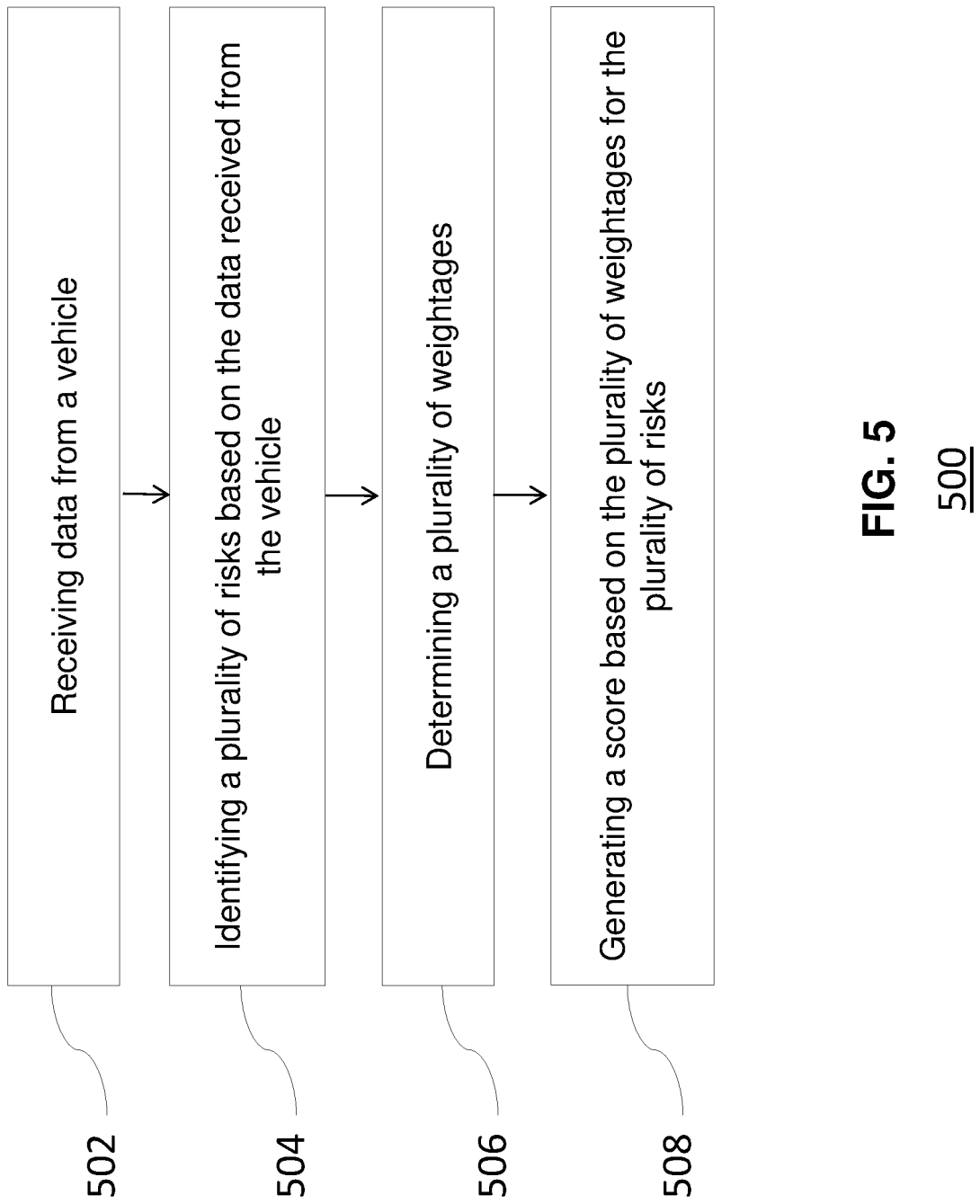
FIG. 5 depicts a flowchart of steps involved in evaluating driving risk in accordance with the present embodiment.

And referring to FIG. 5, a flowchart 500 of steps involved in a method for evaluating driving risk in accordance with the present embodiment is depicted. At step 502, data is collected from the vehicle and received by the computing device. The data from the vehicle includes at least one of GPS data, acceleration data and image data. Other data from the vehicle that considered relevant to evaluating the driving risk may also be included, for example, temperature data or data from additional sensors of the vehicle.

At step 504, a plurality of risks is identified based on the data received from the vehicle. The plurality of risks may include and not limited to one or more of the following: not keeping a safe distance, not following traffic lights or traffic signs, not slowing down at road junctions, not signaling, not doing safety checks, and reckless driving. Identifying the risks is executed by the computing device, based on the data previously collected from the vehicle. More specifically, the computing device combines the outputs of the situation classification model and the manoeuvre classification model, and identifies a plurality of risks based on matching of the combined outputs. Optionally, there can be an integrated model at step 504 for processing the outputs from the situation classification model and the manoeuvre classification model.

The present disclosure of the method of identifying risks has the advantage of classifying more complicated driving scenarios and identifying driving risks more accurately, attributing to the situation classification model. For example, if the situation classification model shows the driver is driving on the highway in fast moving traffic, and the driver's vehicle is not close to the vehicle in front but there is a vehicle behind, the driver braking hard in this situation will be identified as a risk. Instead, if the situation classification model shows that the vehicle in front suddenly brakes hard, in this situation the driver braking hard while maintaining a safe distance to the vehicle in front will not be identified as a risk.

In another example, if the situation classification model shows the vehicle is approaching a traffic light junction and the traffic light is red, the driver accelerating will be identified as a risk of not following traffic light. In another scenario, if the traffic light is amber, the driver accelerating may be identified as a risk of reckless driving.

The present disclosure of the method of identifying risks also has the advantage of incorporating driver's manoeuvres and identifying potential driving risks more effectively, attributing to the manoeuvre classification model. For example, if all the GPS data, acceleration data and image data from the camera with external view is showing the driver is driving safely on the road, but the camera with in-cabin view shows the driver does not have his seat belt on, it will be identified as a risk of not doing safety checks. Other examples include the camera with in-cabin view shows the driver is checking his phone frequently, the driver's eyes are not on the road, the driver is showing signs of intoxication/fatigue/distraction, the driver's posture is not safe for driving, and the driver is not signaling when turning or switching lane.

Each occurrence of the various risks identified will be logged and saved for generating a score of the driving risk later.

At step 506, a plurality of weightages is determined to assign a respective weightage for each of the risks. The weightages are user-defined and can be determined based on the severity of the risks or other factors depending on the interest of user. User of the computing device and method in the present disclosure can be insurance providers, police department, autonomous vehicle companies, the driver himself/herself, or the driver's family member/guardians.

Referring to the earlier example, the risk of not following traffic lights (accelerating when the traffic light is red) may get assigned a weightage of 5, and the risk of reckless driving (accelerating when the traffic light is amber) may get assigned a weightage of 3. For the same type of risk, the weightages can be determined and assigned to reflect differences in severity, defined by the user. For example, speeding exceeding 15% of the regulated speed may get assigned a weightage of 2, speeding exceeding 30% of the regulated speed may get assigned a weightage of 7, and speeding exceeding 30% of the regulated speed with a child in the vehicle may get assigned a weightage of 10.

The weightage may also be determined by the user to include more comprehensive factors. For example, the weightages can include a punishment system to penalize drivers who continuously committing the same risks. For example, the risk of not signaling when switching lane may get assigned a weightage of 1. If the driver commits the same risk in a week, or any period of time set by the user, the same risk of not signaling when switching lane may get assigned an increased weightage of 2. The weightage can be user-defined to increase at a higher rate if the risk is being repeated over time, or to return to the initial value if the driver stops committing the risk over a period of time (i.e., to reward drivers who correct their mistakes).

At step 508, a score is generated based on the respective weightages of the risks. The score can be calculated by summing the weightages of all the risks identified or other means of calculation defined by the user. In the present example, a higher score indicates a higher driving risk.

The score can be related to a certain driver (e.g., for the use of insurance providers). For assign the risks occurred to the correct driver, available facial recognition methods can be employed on the image data of the camera with in-cabin view to identify the driver. Alternatively, facial recognition may be substituted with other biometric methods (e.g., fingerprint matching, iris matching) or identity documents (e.g., driver license, ID, passport, smart cards).

The score can be generated based on previous collected data within a predetermined period of time or can be generated for real-time data received from the vehicle. The data may be processed locally onboard by the computing device 10 located in the vehicle, or remotely in the cloud. Due to the extensiveness of the data, the user may obtain a wide range of information with the appropriate analysis methods additional to the driving risk. For example, studies based on the data can provide information on the drivers' response time, safest time of the day for driving, zones with high accident risks and the alike. Such information can be used for driving training (for both drivers and autonomous vehicles), accident preventing and onboard intelligent driving system design purposes.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

The invention claimed is:
1. A system for evaluating driving risk, comprising:
 a vehicle; and
 a computer device,
 wherein the vehicle comprises:

one or more cameras for capturing image data, wherein the one or more cameras comprise a vehicle external view camera and a vehicle internal view camera;

a GPS device for generating vehicle location and speed data; and an accelerometer for generating vehicle acceleration data;

wherein the computing device comprises:

an input circuit configured to receive data from the vehicle, the data comprising the vehicle location data, the vehicle acceleration data and the image data, wherein the image data comprises external view image data captured by the vehicle external view camera and internal image data captured by the vehicle internal view camera, the external view image data comprising images of road condition, images of traffic condition, images of weather condition, images of lighting condition and images of other vehicles and the internal view image data comprising certain driver image data related to a certain driver and driver posture and movement data comprising driver head movement data, driver hand movement data, and driver eye movement data; and a processor configured to train a situation classification model based on the external image data, the vehicle location and speed data, and the vehicle acceleration data received from the vehicle, and based on previous data received from the vehicle or other vehicles using machine learning methods to classify various driving situations and to train a maneuver classification model based on the vehicle location and speed data, the vehicle acceleration data, and the driver posture and movement data received from the vehicle, and based on previous data received from the vehicle or other vehicles received from the vehicle using machine learning methods to classify various driving maneuvers, wherein the processor is further configured to:

identify a plurality of risks associated with the certain driver based on the data received from the vehicle including the internal view image data captured by the vehicle internal view camera identifying a driver of the vehicle when each of the plurality of risks occurs as the certain driver, one or more of the various driving situations classified by the situation classification model, and one or more of the driving maneuvers classified by the maneuver classification model;

determine a plurality of weights, wherein a respective weights is assigned for each of the plurality of risks associated with the certain driver; and generate a score for the certain driver based on the plurality of weights for the plurality of risks associated with the certain driver.

2. The system of claim 1, wherein the processor is further configured to identify the certain driver of the vehicle when each of the plurality of risks occurs based on the internal view image data using facial recognition.

3. The system of claim 2, wherein the processor is further configured to identify the certain driver of the vehicle using one or both of biometric data and a driver identity document or data.

4. The system of claim 1, wherein the plurality of risks comprise at least one of not keeping a safe distance, not following traffic lights or traffic signs, not slowing down at road junctions, not signaling, not doing safety checks or reckless driving.

5. The system of claim 1, wherein the machine learning methods comprise one or more of deep learning, random forest, support vector machines, linear regression, logistic regression, nearest neighbor and decision tree.

6. The system of claim 1, wherein the processor is further configured to utilize the score for the certain driver for at least one of assessing the certain driver's behaviors or providing analysis data to the certain driver's one or more insurance providers.

7. The system of claim 1, wherein the processor is configured to generate the score for the certain driver based on a sum, wherein the sum is based on respective ones of the plurality of weights assigned for each of the plurality of risks associated with the certain driver.

8. The system of claim 7, wherein the sum is based on a number of occurrences for each of the plurality of risks and the respective ones of the plurality of weights assigned for each of the plurality of risks associated with the certain driver.

9. The system of claim 8, wherein the respective ones of the plurality of weights assigned for each of the plurality of risks associated with the certain driver increases at a predetermined rate, and wherein the predetermined rate is based on the number of occurrences for the respective one of the plurality of risks associated with the certain driver in a predetermined period of time.

10. The system of claim 1, wherein the vehicle acceleration data generated by the accelerometer comprises acceleration data and G-force data, and wherein the processor is further configured to train a maneuver classification model as a situation classification model based on maneuver and impact detection determined from the vehicle acceleration data and G-force data received from the vehicle.

11. The system of claim 1, wherein the computing device is located separately from the vehicle and communicatively coupled to the vehicle for receiving the data from the vehicle.

12. A method for evaluating driving risk, comprising:

receiving data from a vehicle, the data comprising GPS data including vehicle location and speed data, acceleration data and image data, wherein the image data comprises external view image data of external views of a surrounding environment outside the vehicle and internal view image data comprising an in-cabin view inside the vehicle, the external view image data comprising images of road conditions, images of traffic conditions, images of weather conditions, images of lighting conditions and images of other vehicles in the surrounding environment outside the vehicle, and the internal view image data comprising certain driver image data related to a certain driver and driver posture and movement data comprising driver head movement data, driver hand movement data, and driver eye movement data;

training a situation classification model based on the external image data, the GPS data, and the acceleration data received from the vehicle, and based on previous data received from the vehicle and/or other vehicle using machine learning methods to classify various driving situations;

training a maneuver classification model based on the GPS data, the acceleration data, and the driver posture and movement data, and based on previous data received from the vehicle and/or other vehicles using machine learning methods to classify various driving maneuvers;

thereafter identifying a plurality of risks associated with a certain driver based on the data received from the vehicle including the internal view image view data captured by the vehicle internal view camera when each of the plurality of risks occurs identifying a driver of the vehicle as the certain driver, one or more of the various driving situations classified by the situation classification model and one or more of the driving maneuvers classified by the maneuver classification model;

determining a plurality of weights associated with the certain driver, wherein a respective weights is assigned for each of the plurality of risks; and generating a score for the certain driver based on the plurality of weights for the plurality of risks associated with the certain driver.

13. The method of claim 12, wherein the method further comprises identifying the certain driver of the vehicle when each of the plurality of risks occurs based on the internal view image data using facial recognition.

14. The method of claim 13, wherein the method further comprises identifying the certain driver of the vehicle using one or both of biometric data and a driver identity document or data.

15. The method of claim 12, wherein the plurality of risks comprise at least one of not keeping a safe distance, not following traffic lights or traffic signs, not slowing down at road junctions, not signaling, not doing safety checks or reckless driving.

16. The method of claim 12, wherein the machine learning methods comprise one or more of deep learning, random forest, support vector machines, linear regression, logistic regression, nearest neighbor and decision tree.

17. The method of claim 12, further comprising utilizing the score for the certain driver for at least one of assessing the certain driver's behaviors or providing analysis data to the certain driver's one or more insurance providers.

18. The method of claim 12, wherein generating the score comprises generating the score for the certain driver based on a sum, wherein the sum is based on respective ones of the plurality of weights assigned for each of the plurality of risks associated with the certain driver.

19. The method of claim 18, wherein the sum is based on a number of occurrences for each of the plurality of risks and the respective ones of the plurality of weights assigned for each of the plurality of risks associated with the certain driver.

20. The method of claim 19, wherein the respective ones of the plurality of weights assigned for each of the plurality of risks associated with the certain driver increases at a predetermined rate, and wherein the predetermined rate is based on the number of occurrences for the respective one of the plurality of risks associated with the certain driver in a predetermined period of time.

21. The method of claim 12, wherein receiving data from the vehicle further comprises receiving G-force data from the vehicle, and wherein training the situation classification model comprises training a maneuver classification model as a situation classification model based on maneuver and impact detection determined from the acceleration data and the G-force data received from the vehicle.

* * * * *